United States Patent [19]

Roberts

[11] 3,730,652
[45] May 1, 1973

[54] FLUID PRESSURE DEVICES

[75] Inventor: George Wavell Roberts, Crofton, near Wakefield, England

[73] Assignee: Gravoki Systems Limited, Hinckley, Leicestershire, England

[22] Filed: Sept. 21, 1972

[21] Appl. No.: 291,034

Related U.S. Application Data

[63] Continuation of Ser. No. 53,374, July 9, 1970.

[52] U.S. Cl. .................... 417/568, 417/275, 92/60.5
[51] Int. Cl. ...... F01b 31/14, F04b 21/02, F04b 49/00
[58] Field of Search ..................... 92/60.5; 417/568, 417/53, 275, 277

[56] References Cited

UNITED STATES PATENTS

| | | | |
|---|---|---|---|
| 2,761,615 | 9/1956 | Prince | 92/60.5 |
| 3,109,378 | 11/1963 | Baines | 417/568 X |
| 3,039,399 | 6/1962 | Everett | 417/568 X |

FOREIGN PATENTS OR APPLICATIONS 12,803  11/1908  Great Britain .................. 417/568

*Primary Examiner*—Carlton R. Croyle
*Assistant Examiner*—Richard E. Gluck
*Attorney*—John A. Mawhinney

[57] ABSTRACT

In a fluid pressure device a compressible liquid is acted upon by a liquid displacement surface contained in a pressure chamber having a valve means for controlling the inlet of liquid thereto and the outlet of liquid therefrom. Said chamber includes portions defining respectively a volume swept by the liquid displacement surface and a volume unswept thereby; and during operation of the device with the valve means closed the liquid displacement surface is displaced to compress a volume of liquid equal to the swept volume into a volume of liquid equal to the unswept volume to produce a predetermined liquid pressure within the pressure chamber without any output of compressible liquid from the device.

10 Claims, 3 Drawing Figures

-FIG. 2-

Patented May 1, 1973            3,730,652

FLUID PRESSURE DEVICES

This is a continuation of application Ser. No. 53,374, filed on July 9th 1970.

This invention relates to a compressible fluid pressure device hereinafter defined as a pump, for example of the piston type, which, during operation, pressurize oil or some other compressible fluid.

It is known that, to a certain degree, oil is a compressible fluid and that, to a general approximation, it may be compressed at the rate of 1 per cent by volume per 2,500 pounds per square inch (p.s.i.) pressure applied thereto. Consequently, in a pump with an unswept volume 100 times greater than a swept volume, a pressure of 2,500 p.s.i. applied to a volume of oil equal to the swept volume will compress the latter into a volume of oil equal to the unswept volume with no output of oil from the pump. Further under approximately maximum power output conditions (product of pressure times output flow rate) approximately one-half of the compressible liquid occupying said portion defining the swept volume is compressed into compressible liquid occupying said portion defining the unswept volume. Work must be done in compressing the oil and this work is converted into energy stored in the compressed oil itself. By allowing the compressed oil to expand, the energy stored is dissipated, and may be utilized to perform work. Thus if in one cycle of operation of the pump oil is compressed and then allowed to expand, then with no output of oil from the pump, maximum pressure is achieved during any one cycle. If no work output is required then there is no need to provide separate means, such as a relief valve, for relieving the oil pressure built up in the pump. When the pump is driven by a prime-mover, there is no tendency for the prime-mover to stall when no oil output is required because the energy stored in the compressed oil is used to maintain the pumping operation.

An object of the invention is to achieve a pump which, during operation, utilizes the compressibility of compressible fluid, such as oil.

According to the invention there is provided a fluid pressure device comprising a pressure chamber for containing a compressible fluid, a fluid displacement surface displaceable in said pressure chamber to pressurize compressible fluid therein, the pressure chamber including a first portion thereof defining a volume swept by the fluid displacement surface and a remaining portion defining a volume unswept by the fluid displacement surface, the ratio of said portion defining the swept volume to said portion defining the unswept volume being such that, during operation of the device, compressible fluid in said portion of the pressure chamber defining the swept volume is compressed into said portion of the pressure chamber defining the unswept volume by the fluid displacement surface to produce a predetermined fluid pressure within the pressure chamber.

There follows a description of some particular embodiments of the invention, by way of example only, with reference to the accompanying drawings in which.

Figure 1:
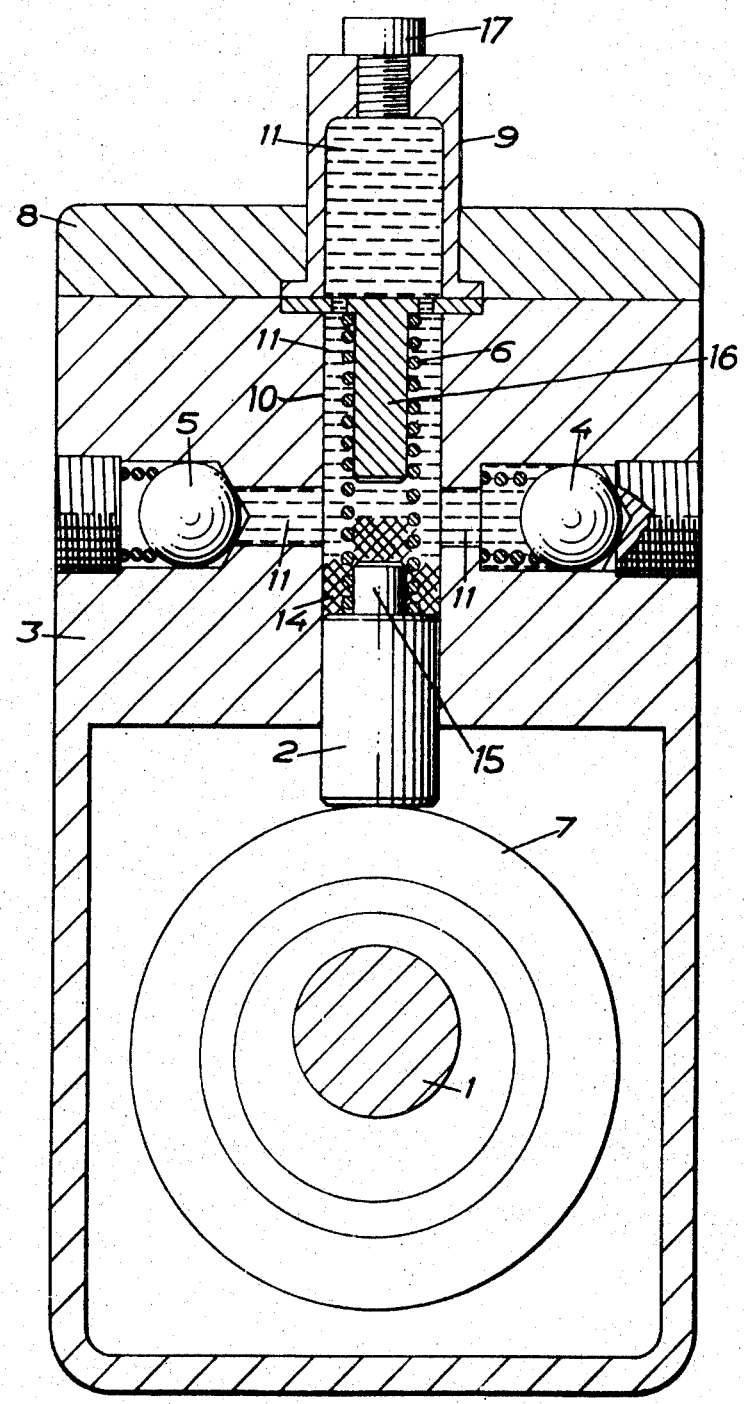
FIG. 1 shows a sectional elevation of a single piston pump.

Referring to FIG. 1, a pump 3 includes a casing enclosing a cam 7 eccentrically-mounted on a shaft 1 which is drivably connected to a prime-mover (not shown). The pump 3 also includes a pressure chamber 10 into which is slidably fitted a piston 2. The lower flat face of the piston 2 engages the cam 7 and the opposite face of the piston 2 has an integral boss 15 which serves to locate the lower end of a coil spring 6 lying within the pressure chamber 10 and urging the piston 2 into contact with the cam 7. Upward movement of the piston 2 is opposed by the spring 6 and is limited by engagement of its integral boss 15 with a central stop 16 which also serves to locate the upper end of the spring 6.

The pressure chamber 10 includes a first portion defining a volume 11 unswept by the piston 2 during operation of the pump and a remaining portion defining a volume 14 swept by the piston 2 during operation of the pump. The pump 3 has a detachable head part 8 which includes a reservoir 9 defining a continuation of the unswept volume 11 of the pressure chamber 10. The reservoir 9 has a aperture closed by a removable plug 17 and which may be utilized as described later.

A spring-loaded outlet valve 5 and a spring-loaded inlet valve 4 communicate directly with the unswept volume 11 of the pressure chamber 10. The outlet valve 5 may be connected by a fluid line to a load upon which work is to be done. During its operation the pump 3 serves to couple power produced by the prime-mover to the load, as and when required.

The cycle of operation of the pump 3 is generally as follows:

The cam 7 is rotated by drive transmitted through the shaft 1 from a prime-mover and the piston 2 is constrained to reciprocate within the pressure chamber 10. FIG. 1 shows the piston 2 at its lowest or "rest" position in the piston chamber 10. In this condition both the unswept volume 11 and swept volume 14 of the piston chamber 10 are filled with a chosen compressible fluid and the inlet and outlet valves, 4 and 5 respectively, are closed. Rotation of the cam 7 urges the piston 2 into the swept volume 14 and fluid therein is compressed into the unswept volume 11. If the outlet valve 5 remains closed a condition is reached in which the entire amount of fluid originally in the swept volume 14 has been displaced by the upward travel of the piston 2 and compressed into the unswept volume 11. The piston 2 is then at the end of its upward stroke and maximum pressure is achieved within the pressure chamber 10. As the outlet valve 5 is closed there is no immediate relief to this pressure build-up in the fluid. Since work has been done on the fluid by the prime-mover during the compression stroke of the piston an equivalent amount of energy, allowing for small losses, for example due to friction, is stored in the compressed fluid with the outlet valve 5 closed. Initially, this stored energy can only be released when the piston 2 is on its return, downward stroke towards the rest position. In fact this stored energy is dissipated in the form of mechanical work done against the piston 2 during the return stoke and thereby giving the piston momentum at the end of its return stroke. Thus the prime-mover is relieved of the necessity to do work during the return stroke of the piston and is aided by the momentum of the piston during the subsequent upward stroke. Thus in any one cycle of operation of the pump 3, with no output of hydraulic fluid, the prime-mover is required to perform less work than in conventional pumps, because work done during one half of the pumping cycle is utilized during a subsequent half of the pumping cycle. Consequently a smaller prime-mover, or one of the same size but running at a lower speed, may be utilized than would be required for a conventional hydraulic pump of corresponding work capacity.

If, during the pump cycle, the pressure on the output side of the outlet valve 5 falls below the fluid pressure level in the pressure chamber 10, the outlet valve opens and fluid is discharged from the pressure chamber 10 to whatever load is connected to the output side of the pump 3. If the load is such that the outlet valve is open during the entire upward stroke of the piston 2, then a volume of fluid equal to the swept volume 14 is discharged and no pressure is built up inside of the pump. In this way a high output flow of fluid at a relatively low pressure can be accommodated. Fluid delivered through the outlet valve 5 to the load is returned to the pump through the inlet valve 4 upon the return stroke of the piston 2 to its rest position. Should the pressure on the output side of the outlet valve 5 be high, then the fluid in the pump chamber 10 is compressed until a slightly higher fluid pressure is built up, whereupon the outlet valve opens and there is a high pressure discharge, at a relatively low flow rate, of fluid to the load. Thus the pump is suitable for use in conjunction with fluid-driven presses and is without the disadvantage of known pumps which require a two-stage pump arrangement or conventional rams employing a pre-fill valve. The rate of operation of the pump 3 is such that after any fluid discharge for the purpose of performing work on an external load, pressure is quickly restored in the pressure chamber 10 and, on average, the fluctuations in pressure over any one cycle do not adversely affect the work load on the prime-mover. In this way sudden load demands on the pump 3 can be accommodated from the energy stored in the compressed fluid thereby cushioning any shock-loading upon the prime-mover.

The rate of output flow and pressure of fluid may be varied by adjusting the unswept volume 11 of the pressure chamber 10 in relation to the fixed swept volume 14. This could be achieved by introducing a movable piston into the pressure chamber 10 for example in the reservoir 9 reduction of the unswept volume 11 would result in an increase in the fluid pressure built up in the pump chamber 10 by virtue of the necessity for the piston 2 to compress a volume of fluid equal to the swept volume into a volume of fluid equal to the reduced unswept volume 11. For a given load and hence pressure on the output side of the outlet valve 5, reduction in the unswept volume 11 results in an increase in the amount of fluid discharged during an upward stroke of the piston 2. Increasing the unswept volume will have the reverse effect. Such an increase could be achieved by connecting the unswept volume 11 to say a fluid line communicating directly with the reservoir 9 through the aperture previously closed by the plug 17. The fluid line would be connected to additional reservoirs located on the pump body itself, or away altogether from the pump 3. In the latter case remote control of the unswept volume could be effected. Alternatively other pneumatic, hydraulic, mechanical, electronic or manual control systems could be employed to effect control of the unswept volume 11. Instead of connecting the reservoir 9 to an additional reservoir, the portion of the chamber 10 defining the unswept volume may communicate directly with an additional chamber mounted on or integral with the chamber 10.

Figure 2:
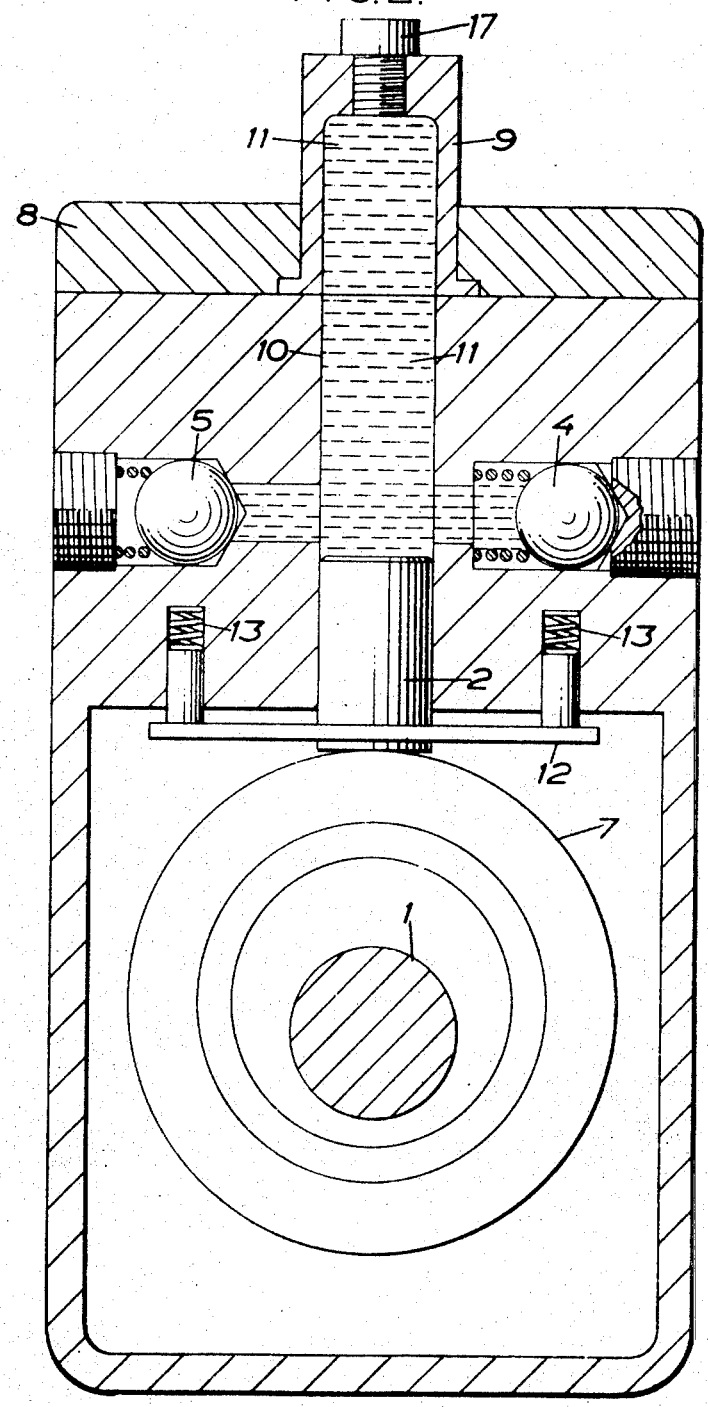
FIG. 2 shows a sectional elevation of a pump similar to that shown in FIG. 1, but with an alternative piston spring loading arrangement.

FIG. 2 shows a similar pump 3 to that described with reference to FIG. 1 except that the piston 2 is shown at the end of its upward stroke and that the piston return spring arrangement employs a pair of springs 13 located outside the pressure chamber 10 and acting on a cross-bar 12 attached to the piston 2. The operation of the pump 3 corresponds to the operation of the pump 3 shown in FIG. 1. Both the constructions of pumps 3 shown in FIGS. 1 and 2 could be employed in a multi-piston pump. The pressure chambers for each piston could be arranged in line with respect to a common drive shaft provided with a series of cams, each cam for operating an individual piston. The individual pistons could reciprocate co-operatively in the manner of known reciprocating multi-piston pumps. However the dimensions of individual pressure chambers could be varied to suit the particular load driven by their part of the pump.

In either single or multi-piston pumps any suitable means may be employed to operate the pistons in place of the cam-shaft arrangement previously described.

Figure 3:
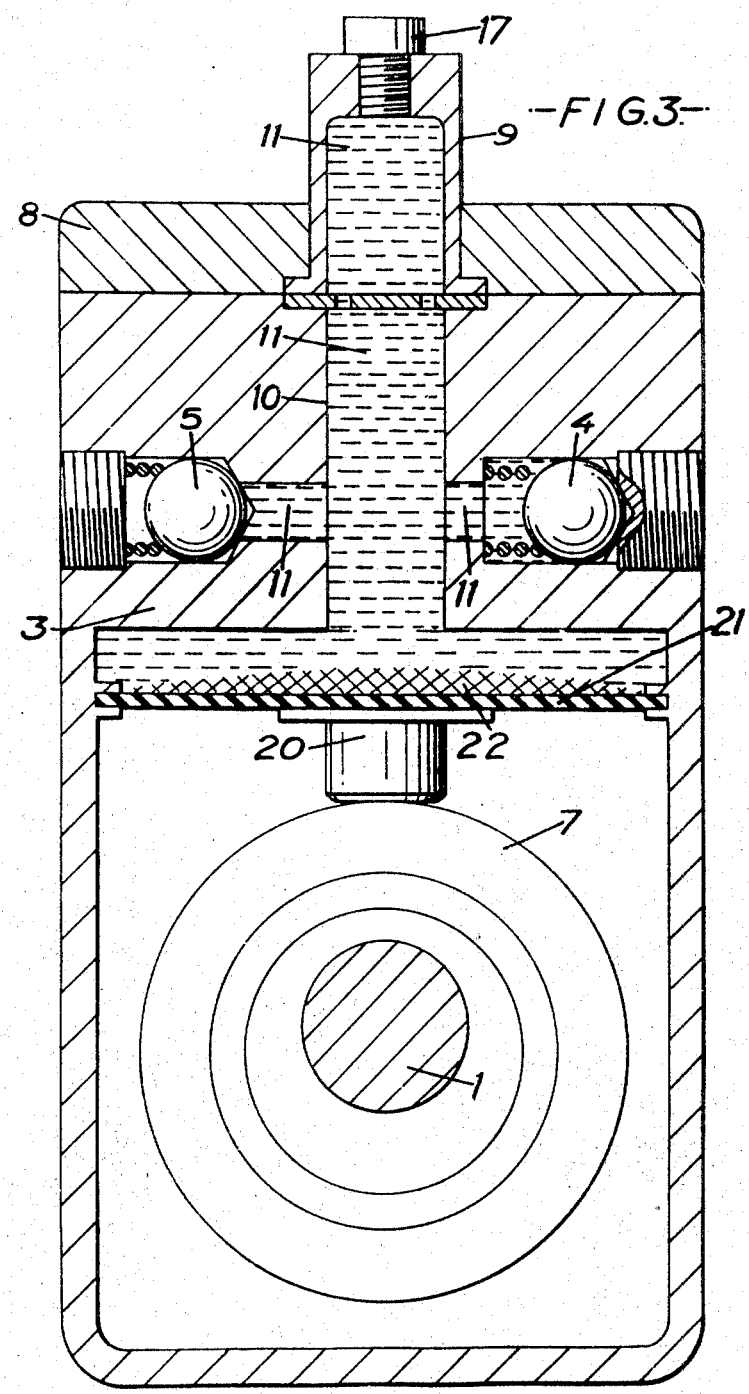
FIG. 3 shows a sectional elevation of a hydraulic pump employing a diaphragm in place of a piston.

FIG. 3 shows another embodiment of a pump 3 which is similar to the pumps 3 described with reference to FIGS. 1 and 2 except that fluid in the pressure chamber 10 is acted upon directly by a flexible diaphragm 21. The diaphragm 21 is attached to the casing of the pump 3 and is engaged on its underside by a cam follower 20 movable by the cam 7. The diaphragm 21 also serves to seal one end of the pumping chamber 10. Displacement of the diaphragm from its undeflected or "rest" condition is less than that to which the piston 2 of the pumps shown in FIGS. 1 and 2 is subjected because the diaphragm 21 has a larger surface area in contact with the fluid. Consequently the same swept volume 22 can be achieved for a smaller displacement of the diaphragm 21. The cam follower 20 is kept in contact with cam 7 by the inherent resilience of the diaphragm 21 and hence there is no need for any additional spring arrangement.

It will be appreciated that the pumps described with reference to FIGS. 1, 2 and 3 operate in such a manner that speed changes due to load variations on the prime-mover are kept to a minimum since load variations simply affect the proportion of the work done by the prime-mover in compressing the fluid which is transferred to the load, rather than returned to the transmission linking the prime-mover and pump during expansion of the fluid.

The fluid pump described is applicable to fluid transmissions, for example, in vehicles, where full control of power output is required.

What I claim as my invention and desire to secure by Letters Patent of the United States is:

1. A liquid pressure device capable of operating as a pump with a reciprocating positive displacement stroke and a variable liquid output flow decreasing while maintaining said stroke constant at a predetermined value with increasing demanded output pressure to zero output flow and maximum operating pressure conditions, which device comprises a pressure chamber for containing a compressible liquid, a liquid displacement surface displaceable in said pressure chamber to pressurize compressible liquid therein, the pressure chamber including a first portion thereof defining a volume swept by the liquid displacement surface during said displacement stroke and a remaining second portion more than one order of magnitude larger than the first portion and defining a volume unswept by the liquid displacement surface, and valve means for controlling the inlet of liquid to said pressure chamber and the outlet therefrom, the ratio of said portion defining the swept volume to said portion defining the unswept volume being such that, when during operation of the device under said zero output flow and maximum operating pressure conditions with said valve means closed throughout the reciprocating stroke so there is no output of compressible liquid from the device, the compressible liquid occupying said portion defining the swept volume is compressed into compressible liquid occupying said portion defining the unswept volume.

2. A liquid pressure device as claimed in claim 1 including drive means for successively reciprocating said liquid displacement surface within the said pressure chamber to effect repeated pressurizing of said compressible liquid.

3. A liquid pressure device as claimed in claim 2 including a piston reciprocatable in a bore defining said pressure chamber, said liquid displacement surface being defined by an end surface of said piston.

4. A liquid pressure device as claimed in claim 2, wherein the liquid displacement surface comprises a flexible diaphragm arranged to seal one end of said pressure chamber.

5. A liquid pressure device as claimed in claim 2, wherein said drive means is an eccentrically-mounted cam surface which operates on one side of said liquid displacement surface, the opposite side of said liquid displacement surface engaging liquid contained in the pressure chamber.

6. A liquid pressure device as claimed in claim 1, wherein a reservoir is connected to said pressure chamber to contain an additional volume of compressible liquid unswept by the liquid displacement surface.

7. A liquid pressure device as claimed in claim 6, wherein means are provided to vary the volume of said reservoir according to the size of unswept volume required.

8. A liquid pressure device as claimed in claim 2, wherein said valve means includes a non-return inlet valve and a non-return outlet valve communicating directly with said portion of the pressure chamber defining the unswept volume.

9. A liquid pressure device as claimed in claim 8, wherein said portions respectively defining the swept and unswept volumes of the pressure chamber are of a size according to the required output of compressible liquid per stroke of the liquid displacement surface from its undeflected position, the maximum pressure required in the pressure chamber and the type of compressible liquid employed.

10. A liquid pressure device capable of operating as a pump with a reciprocating positive displacement stroke and a variable liquid output flow decreasing while maintaining said stroke constant at a predetermined value with increasing demanded output pressure, which device comprises a pressure chamber for containing a compressible liquid, a liquid displacement surface displaceable in said pressure chamber to pressurize compressible liquid therein, the pressure chamber including a first portion thereof defining a volume swept by the liquid displacement surface during said displacement stroke and a remaining second portion more than one order of magnitude larger than the first portion and defining a volume unswept by the liquid displacement surface, and valve means for controlling the inlet of liquid to said pressure chamber and the outlet therefrom, the ratio of said portion defining the swept volume to said portion defining the unswept volume being such that, when during operation of the device under approximately maximum power output conditions (product of pressure times output flow rate) approximately one-half of the compressible liquid occupying said portion defining the swept volume is compressed into compressible liquid occupying said portion defining the unswept volume.

* * * * *